Oct. 11, 1955
D. S. KENNEDY
2,720,405
COUPLING
Filed Dec. 3, 1952
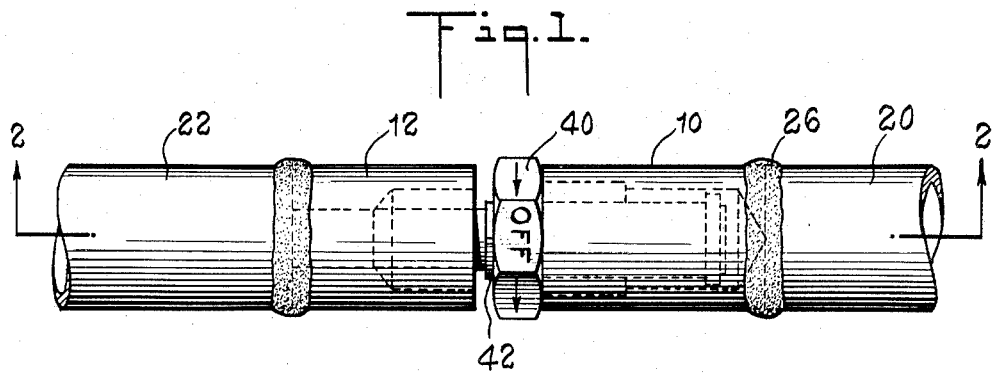
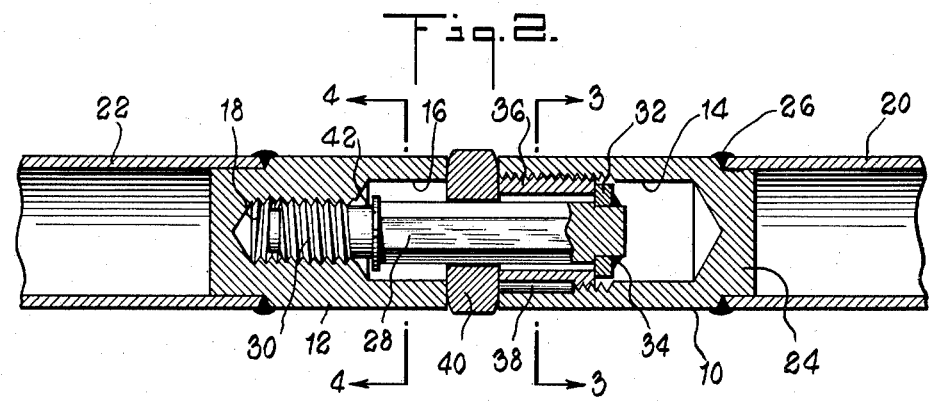
INVENTOR.
DONALD S. KENNEDY
BY Davis, Hoxie & Faithfull
ATTORNEYS

United States Patent Office 2,720,405
Patented Oct. 11, 1955

2,720,405
COUPLING

Donald S. Kennedy, Hingham, Mass., assignor to the D. S. Kennedy & Company, Cohasset, Mass., a corporation of Massachusetts Application December 3, 1952, Serial No. 323,803

1 Claim. (Cl. 287—2)

This invention relates to tube couplings and more particularly to couplings such as used to join tubes which are used as structural elements.

Objects of this invention are to provide a coupling which provides an axial connection between two pieces of tubing, which is mechanically strong, which has substantially the same outer dimensions as the tubing, which is attractive in appearance, which provides a joint that is readily made or broken, which is simple in construction, and which advances the art generally.

A coupling in accordance with my invention comprises two body members which are preferably cylindrical in form and substantially the same diameter as the tubing so that the members can be permanently fixed to the end of a corresponding piece of tubing, for example, by welding or brazing. Each of the members has a recess whose axis is aligned with the axes of the pieces of tubing so that outer ends of the recesses are adjoining when the coupling is assembled. At least one of the recesses is provided with internal threads for engaging the external threads upon one end of an elongated member. The opposite end of the elongated member is restrained in the recess in the second body member by means which permit limited axial travel without interfering with the rotation thereof, for example, by threading a hollow bushing in the recess in the second body member and providing the restrained end of the elongated member with a head which has a greater diameter than the internal diameter of the bushing aperture. A nut is slipped over the elongated member, the aperture in the nut and the cross section of the elongated member having a configuration such as one or more flats, which prevents relative rotation therebetween so that the nut can be turned to bring the threads into engagement to draw the portions of the respective body members which are adjacent the recesses into abutment with the opposite sides of the nut. If the outer dimensions of the body members and the nut are made substantially the same in diameter as the pieces of tubing, the engagement of threads result in a strong, attractive, streamlined mechanical unit which is readily made or broken to connect or disconnect the pieces of tubing.

These and other objects and aspects will be apparent from the following description of a specific embodiment of the invention referring to drawings wherein:

Fig. 1 is a side elevation view;
Fig. 2 is a sectional view on line 2—2 of Fig. 1;
Fig. 3 is a sectional view on line 3—3 of Fig. 2; and
Fig. 4 is a sectional view on line 4—4 of Fig. 2.

The coupling chosen for the purpose of illustration comprises two cylindrical body members 10 and 12 which are provided respectively with axially disposed recesses 14 and 16. The recess 14 has internal threads which extend inwardly from the open end thereof for approximately half the depth of the recess. The bottom portion of the recess 16 is of reduced diameter as at 18 and is provided with internal threads. The external diameters of the body members 10 and 12 are made substantially the same as that of the outer diameters of the respective pieces of tubing 20 and 22 which are joined by the coupling.

The end of the body member 10 opposite the recess 14 is reduced in diameter for a short axial distance as at 24 so that it fits snugly inside of the end of the tubing 20. A permanent connection is made between the body member 10 and the tubing 20 by welding or brazing as at 26. The tubing 22 is fixed to the body member 12 in an analogous manner.

Interconnection between the body members 10 and 12 is made by means of an elongated member such as the bolt 28 one end of which is threaded as at 30. The other end of the bolt 28 is provided with a head consisting of a washer 32 which fits over a necked down portion of the bolt end. The washer 32 is secured to the bolt 28 by welding or brazing as at 34 although it is to be understood that the head can be formed integrally with the shank of the bolt. The headed end of the bolt 28 is restrained in the recess 14 in the body member 10 by means of a hollow bushing 36 which has external threads for engaging the internal threads in the recess, the aperture in the bushing being larger than the shank of the bolt 28 so that the bolt passes therethrough with clearance. The bushing 36 is locked in the body member 10 by means of a pin 38. It will be evident that the above described construction permits limited axial travel of the bolt 28 with respect to the body member 10 without interfering with the rotation of the bolt.

The bolt 28 is rotated to bring its threads into engagement with the threads 30 of the body member 12 by means of a nut 40 having a centrally disposed aperture so that the nut can be slipped over the shank of the bolt. Although I have shown the shank of the bolt 28 to be hexagonal in cross section and the aperture in the nut 40 to have a similar configuration, it is to be understood that other configurations such as a single flat on the shank of the bolt or curvilinear surfaces other than circular can be used so long as there is no relative rotational movement between the bolt 28 and the nut 40. The periphery of the nut 40 is shown hexagonal, the distance across the flat of which is substantially the same as the outer diameter of the body members 10 and 12, but any other configuration which is adapted to receive a wrench can be used. A snap ring 42 prevents the nut 40 from falling off the shank of the bolt 28 when the coupling is broken.

The coupling is assembled by inserting the threaded end of the bolt 28 in the recess 16 and turning the nut 40 so that the threads 30 engage the internal threads in the recess 18 until the ends of body members 10 and 12 are brought into abutment respectively with the opposite sides or faces of the nut 40. The coupling is disassembled to break the joint by turning the nut 40 in the opposite direction to disengage the threads to permit the body members 10 and 12 to be separated. It is advisable to indicate upon the periphery of the nut 40 the rotational direction required to disassemble the coupling so that a mechanic can determine the way in which to turn the nut in order to loosen it.

I claim:

A coupling for joining the ends of two pieces of tubing comprising two body members whose external diameters are substantially the same as that of the tubing pieces, one end of each of the body members being of reduced diameter and inserted in the end of the corresponding piece of tubing, the resulting joint between the member and tubing being welded thereby making a permanent connection therebetween, said members having internally threaded recesses of different diameters which are coaxially disposed with respect to the axes of the respective pieces of tubing so that the recesses are confronting when the ends of the body members opposite the welded ends thereof are brought into alignment as the coupling is assembled, an elongated member having a polygonal shank one end of which is externally threaded to engage the internal threads of the smaller body member recess, the other end of the shank having a head which is disposed in the larger recess of the other body member, a hollow bushing surrounding the shank of the elongated member and having external threads which engage the threads of the larger recess so that the elongated member passes through the aperture in the bushing, the head of the elongated member being greater in diameter than the aperture in the bushing so that the head is prevented from leaving the correlated recess, the axial length of the bushing being less than the depth of the recess whereby the axial movement of the elongated member is limited, a nut having a central polygonal aperture which loosely engages the shank of the elongated member whereby rotation of the nut causes the shank threads to engage the internal threads of the smaller recess to bring the ends of the body members opposite the welded ends thereof into abutting engagement with the opposed faces of the nut, and a split ring encircling the shank of the elongated member adjacent the threaded end thereof to prevent the nut from becoming disengaged from the shank when the coupling is disassembled.

References Cited in the file of this patent

UNITED STATES PATENTS

| | | |
|---|---|---|
| 932,744 | Adams | Aug. 31, 1909 |
| 2,004,398 | Steenson | June 11, 1935 |
| 2,214,177 | Raybould | Sept. 10, 1940 |
| 2,298,516 | Streib | Oct. 13, 1942 |
| 2,508,668 | Gascoigne | May 23, 1950 |

FOREIGN PATENTS

| | | |
|---|---|---|
| 591,570 | Great Britain | Aug. 21, 1941 |